United States Patent
Geissler

(10) Patent No.: US 6,614,670 B1
(45) Date of Patent: Sep. 2, 2003

(54) ISOLATION CIRCUIT FOR PROVIDING ISOLATION FROM A SWITCH OF A WELDING POWER SUPPLY

(75) Inventor: Steven Geissler, Little Chute, WI (US)

(73) Assignee: Illinois Tool Works, Glenview, IL (US)

( * ) Notice: Subject to any disclaimer, the term of this patent is extended or adjusted under 35 U.S.C. 154(b) by 25 days.

(21) Appl. No.: 09/678,512

(22) Filed: Oct. 3, 2000

(51) Int. Cl.[7] .............................................. H01F 36/00
(52) U.S. Cl. .............................. 363/56.01; 363/21.12; 363/21.15; 363/27
(58) Field of Search ................................ 363/20, 21.12, 363/21.15, 27, 56.01, 95, 96, 135

(56) References Cited

U.S. PATENT DOCUMENTS

| | | | |
|---|---|---|---|
| 4,417,199 A | 11/1983 | Jones | 323/319 |
| 4,779,034 A | 10/1988 | Shepard, Jr. | 318/804 |
| 5,194,803 A * | 3/1993 | Visser et al. | 323/360 |
| 5,319,533 A * | 6/1994 | Reynolds et al. | 363/17 |
| 5,578,908 A | 11/1996 | Persson | 315/307 |
| 5,821,491 A * | 10/1998 | Dew et al. | 219/108 |
| 6,119,238 A * | 9/2000 | Jennings et al. | 713/300 |

* cited by examiner

*Primary Examiner*—Bao Q. Vu
(74) *Attorney, Agent, or Firm*—Foley & Lardner

(57) ABSTRACT

A circuit for controlling the welding power of a welding power supply includes a control circuit, a switch, and an isolation circuit. The control circuit is configured to generate a command signal. The isolation circuit has a flyback transformer and is configured to receive the command signal and to provide a switch drive signal to the switch in response to the command signal. The switch provides welding power in response to the switch drive signal.

23 Claims, 3 Drawing Sheets

ISOLATION CIRCUIT FOR PROVIDING ISOLATION FROM A SWITCH OF A WELDING POWER SUPPLY

CROSS-REFERENCE TO RELATED APPLICATIONS

Not Applicable.

STATEMENT REGARDING FEDERALLY SPONSORED RESEARCH OR DEVELOPMENT

Not Applicable.

FIELD OF THE INVENTION

The present invention relates generally to a welding power supply having an improved isolation circuit. More specifically, the present invention relates to a system for isolating a control circuit from a switch in a welding power supply.

BACKGROUND OF THE INVENTION

Welding power supplies are typically stand-alone units which receive a standard line voltage and provide a usable welding power at a welding output. The welding power may be alternating current (AC) or direct current (DC), continuous current or constant voltage, three-phase or single-phase, and may include a wide range of amperages, all depending upon operator-selected inputs. Various power and control circuitry is used to shape and time the welding power based upon the operator-selected inputs.

Many welding power supplies utilize switches or gating devices, such as silicon-controlled rectifiers (SCRs), to control the amount of power provided at the welding output. An SCR is a three-terminal device which provides current from an anode to a cathode in response to a current provided to a gate. SCRs are in wide usage in welding power supplies. A control circuit is used to drive the gate to control the SCR.

To drive multiple SCRs in a power conversion circuit, it is necessary to isolate the control circuit from the SCR. A conventional isolation circuit 10 is illustrated in FIG. 1. A command signal is received on the gate 12 of a transistor 14 when it is time to gate the SCR. Transistor 14 turns on and induces a current in a transformer 16. The command signal must be discontinued before transformer 16 saturates. The current created in the primary coil of transistor 16 is reflected on the secondary coil as a gate drive signal, where it is fed through a diode 18 to the gate 20 of SCR 22. Diode 18 protects the secondary coil of transformer 16 from reverse current generated by SCR 22 after it has turned on. The command signal cannot be repeated until transformer 16 resets. The command signal may be reapplied after waiting a sufficient time period for transformer 16 to reset. However, if the command signal is reapplied too soon, the drive current to SCR 22 will be reduced, and it may not be high enough to gate SCR 22. Thus, it would be advantageous if the gate drive signal could be continuous in order to ensure that SCR 22 turns on and remains on so long as the command signal is received.

In addition, transformer 16 must have a high enough primary inductance to sustain a gate drive-signal long enough to fire SCR 22. A typical inductance value is on the order of 20 mH, which requires a large pulse transformer.

One alternative to the circuit of FIG. 1 is to use an opto-isolator circuit. An opto-isolator circuit feeds current from an anode side of the SCR through the opto-switch into the gate. This can become problematic because the voltage source feeding the SCR is an AC signal which is always changing. Thus, the drive current used to turn on the SCR is inconsistent.

Accordingly, there is a need for an improved isolation circuit for a welding power supply. Further, there is a need for an isolation circuit which can provide a continuous current drive to an SCR gate. Further still, there is a need for an isolation circuit having a smaller primary inductance, allowing a smaller, lower-cost transformer to be used. Further yet, there is a need for an isolation circuit which provides a continuous current drive to a switch or gating device in response to a simple digital command signal. The teachings hereinbelow extend to those embodiments which fall within the scope of the appended claims, regardless of whether they accomplish one or more of the above needs.

SUMMARY OF THE INVENTION

According to a first exemplary embodiment, a circuit for controlling the welding power of a welding power supply includes a control circuit, a switch, and an isolation circuit. The control circuit is configured to generate a command signal. The isolation circuit has a flyback transformer and is configured to receive the command signal and to provide a switch drive signal to the switch in response to the command signal. The switch provides welding power in response to the switch drive signal.

According to another exemplary embodiment, a welding power supply includes a power conversion circuit, a control circuit, and an isolation circuit. The power conversion circuit has at least one switch configured to provide welding power. The control circuit is configured to generate a command signal. The isolation circuit is configured to provide isolation between the switch and the control circuit. The isolation circuit is responsive to the command signal to charge a coil during a first phase and discharge the coil during a second phase. The coil provides current to the switch only during the second phase.

According to yet another exemplary embodiment, a circuit for controlling the welding power of a welding power supply includes a means for generating a command signal, a means for gating welding power from a power source to a welding output, and a means for isolating the means for generating from the means for gating and for providing a continuous current drive signal to the means for gating.

BRIEF DESCRIPTION OF THE DRAWINGS

The invention will become more fully understood from the following detailed description, taken in conjunction with the accompanying drawings, wherein like reference numerals refer to like parts, in which.

DETAILED DESCRIPTION OF THE INVENTION

Figure 1:
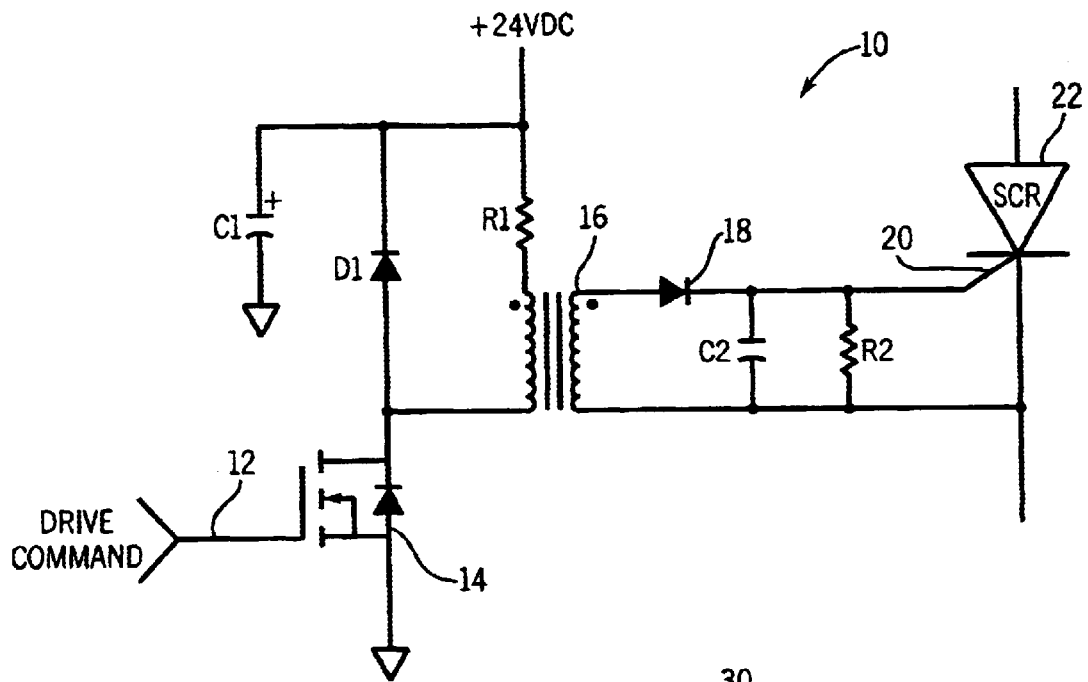
FIG. 1 is a schematic diagram of an isolation circuit according to a prior art teaching.
Figure 2:
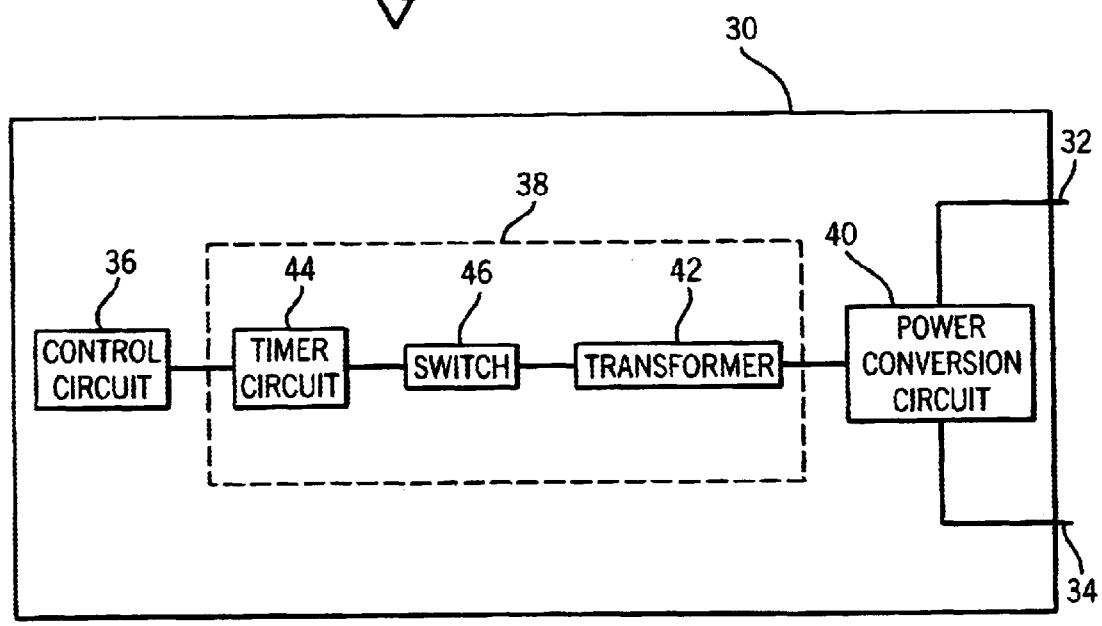
FIG. 2 is a block diagram of a welding power supply according to an exemplary embodiment.

Referring to FIG. 2, a welding power supply 30 is shown according to an exemplary embodiment. Welding power supply 30 may be a Syncrowave 350 LX power supply, manufactured by Miller Electric Mfg. Co., Appleton, Wisconsin. Welding power supply 30 is a tungsten inert gas (TIG)/stick power source, but may alternatively be other types of welding power supplies, such as metal inert gas (MIG), wire feed machines, etc. Welding power supply 30 includes an input 32 for receiving a line voltage or power source, and an output 34 for providing a welding current to an electrode.

Welding power supply 30 further includes a control circuit 36 coupled to an isolation circuit 38, and a power conversion circuit 40. Power conversion circuit 40 includes one or more switches or gates (e.g., a silicon-controlled rectifier (SCR), a transistor, an insulated gate bipolar transistor (IGBT), a gate turn-off thyristor (GTO), a MOSFET-controlled thyristor (MCT), etc.) configured to convert power from the power source received at input 32 to a suitable welding power at output 34. For example, welding power may be provided within a range of 3 to 400 Amperes, with a maximum open-circuit voltage of 80 Volts. In this exemplary embodiment, an AC (alternating current) waveform at the power source is rectified to generate a DC (direct current) welding power provided at output 34 for DC welding. Alternatively or in addition, an AC welding power may be provided. In this exemplary embodiment, power conversion circuit 40 includes multiple SCRs which require timed gating or switching by control circuit 36.

Control circuit 36 is a microprocessor in this exemplary embodiment, but may alternatively be a microcontroller, analog or digital logic, or other control circuitry. Control circuit 36 is powered by DC power provided from an auxiliary power conversion circuit. Control circuit 36 is programmed to fire or gate the switches in power conversion circuit 40 at predetermined times (e.g. firing angles) via control signals provided thereto, and may be gated according to user inputs provided at one or more control knobs or dials mounted to welding power supply 30 (e.g., an amperage adjustment dial). The timing and gating of switches in power conversion circuit 40 to provide welding power waveforms of various shapes, timings, etc. is well known in the art of power supplies.

Isolation circuit 38 is advantageously provided in this exemplary embodiment between control circuit 36 and power conversion circuit 40. Isolation circuit 38 performs the function of separating control circuit 36 from one or more switches within power conversion circuit 40, while still allowing control circuit 36 to provide a switch drive signal to power conversion circuit 40. Isolation circuit 38 includes a flyback transformer 42 in this exemplary embodiment. Flyback transformer 42 is designed to store energy in a coil, thereby acting as an inductor. Flyback transformers typically have current flowing either in a primary coil or in a secondary coil, but not in both coils at the same time. Flyback transformer circuits typically have a square wave input, as opposed to a sinusoidal voltage, which is typically applied to a regular transformer. While these general characteristics are provided as exemplary traits of some flyback transformers, various types of flyback transformers and flyback circuits (e.g., inductors or coils) are contemplated even if they do not satisfy all of the above criteria.

Isolation circuit 38 further includes a timer circuit 44 and a switch 46. Timer circuit 44 may include a one-shot timer, such as an LM555 timer, or other circuitry configured to trigger switch 46 for a predetermined time period. Switch 46 includes a transistor, current source, IGBT, GTO, MCT, etc. Timer-circuit 44 cycles switch 46 on and off for a first charge phase and a second discharge or flyback phase.

In operation, control circuit 36 provides a command signal at a predetermined time and for a predetermined duration to isolation circuit 38. A squarewave digital signal is used for the command signal in this embodiment, but other waveforms may be used (e.g., seesaw, triangle, pulse-width modulated, etc.) When the command signal is received by timer circuit 44, timer circuit 44 triggers switch 46 to begin charging a primary coil of transformer 42. After a short charge time (e.g., 4.5 microseconds), timer circuit 44 expires, thereby turning off switch 46. After switch 46 turns off, the energy stored in the primary coil creates a flyback effect, whereby a raised voltage is present on the primary coil and reflected in the secondary coil, causing current to flow to power conversion circuit 40. When the primary coil has discharged to a predetermined voltage, timer circuit 44 triggers switch 46 again, recharging the primary coil. While the energy within the primary coil is being recharged, a capacitor holds a charge on power conversion circuit 40.

Thus, isolation circuit 38 provides a continuous current to drive power conversion circuit 40. So long as control circuit 36 provides the command signal to isolation circuit 38, isolation circuit 38 holds a continuous current switch drive signal to power conversion circuit 40. This continuous drive current provides more reliable gating of power conversion circuit 40. Notably, the continuous current drive signal need not be an exact DC signal, and may include a small amount of ripple or other waveform imperfection.

Figure 3:
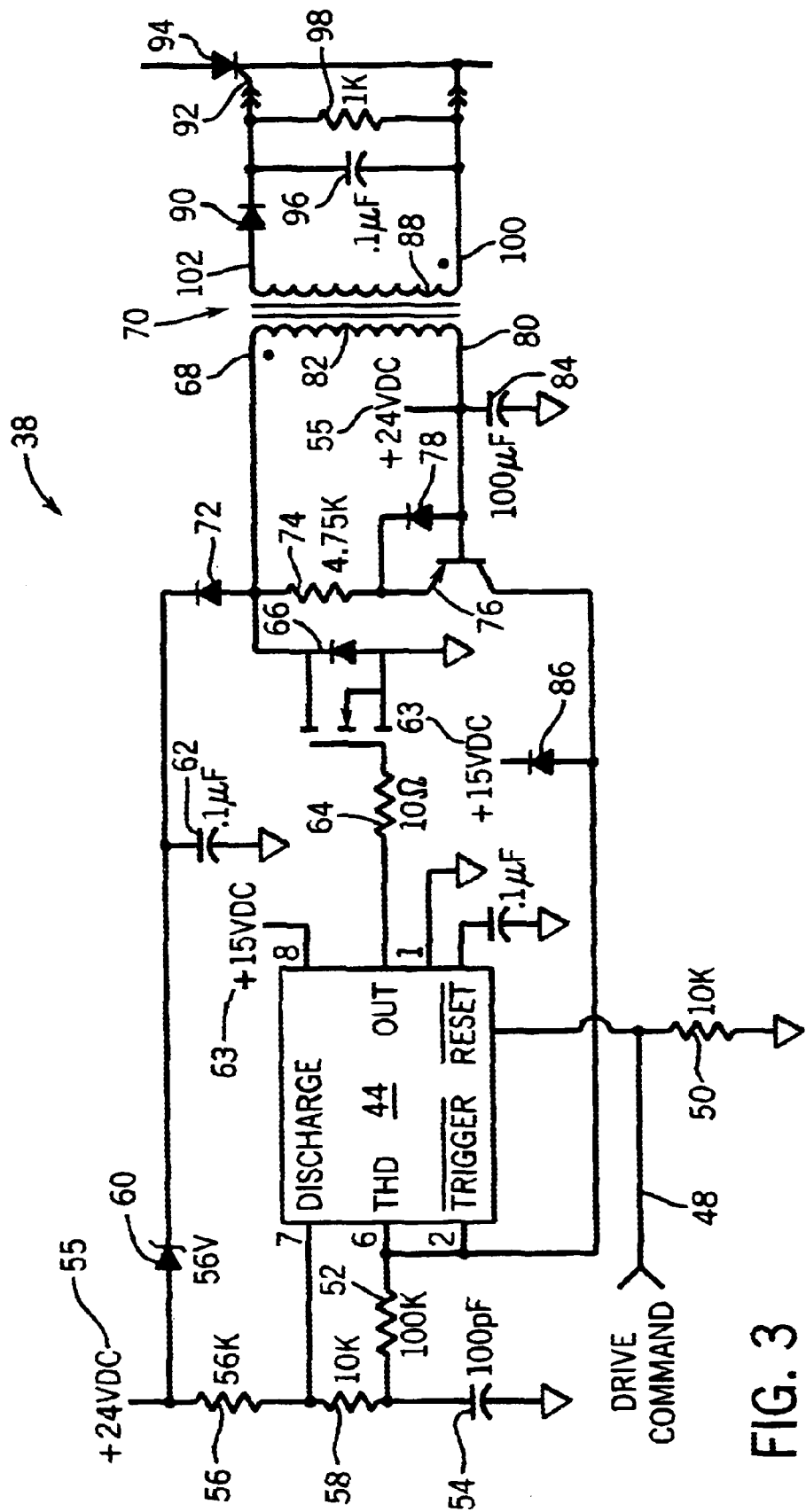
FIG. 3 is a schematic diagram of an isolation circuit according to an exemplary embodiment.

Referring now to FIG. 3, an exemplary embodiment of isolation circuit 38 is shown. Timer circuit 44 has a reset terminal coupled to a command signal line 48 which is coupled through a resistor 50 to ground. A trigger terminal of timer circuit 44 is coupled to a THD terminal of timer circuit 44, and also through a resistor 52 and a capacitor 54, in series, to ground. A DC power supply 55 (e.g., an unregulated +24 VDC supply in this exemplary embodiment) is coupled through a resistor 56 and a resistor 58, in series, to a node between resistor 52 and capacitor 54. A discharge terminal of timer circuit 44 is coupled to a node between resistor 56 and resistor 58. A diode 60 (e.g. a zener diode) has an anode coupled to DC power supply 55 and a cathode coupled through capacitor 62 to ground.

Timer circuit 44 is powered by a second DC power supply 63 (e.g., a regulated +15 VDC power supply). An output terminal of timer circuit 44 is coupled through a resistor 64 to a switch 66 (e.g., an N-type metal-oxide semiconductor field-effect transistor (MOSFET), or other switching device). Resistor 64 is coupled to a gate of switch 66. A drain of switch 66 is coupled to ground. A source of switch 66 is coupled to a first terminal 68 of a primary coil 82 of flyback transformer 70, and also through a diode 72 to a node between diode 60 and capacitor 62. The source of switch 66 is further coupled through a resistor 74 to a collector of a switch 76 (e.g., a PNP transistor or other switch). The collector of switch 76 is coupled to the cathode of a diode 78, the anode of which is coupled to the gate of switch 76. Diode 78 protects switch 76 by preventing a reverse voltage across the gate and collector. The gate of switch 76 is coupled to a second terminal 80 of primary coil 82 of flyback transformer 70. Output terminal 80 is further coupled to DC power supply 55, and is coupled through a capacitor 84 to ground. The emitter of switch 76 is coupled to the trigger and THD inputs of timer circuit 44, and also to the anode of a diode 86, the cathode of which is coupled to DC power supply 63.

Transformer 70 is a flyback transformer, having a primary coil 82 capable of storing energy. Flyback transformer 70 further includes a secondary coil 88 coupled through the anode of a diode 90 to a gate or gate terminal 92 of switch 94. Switch 94 may be any type of switching or gating device suitable for providing welding power from an input terminal to an output terminal, and is an SCR in this exemplary embodiment. SCR is capable of providing welding currents, such as, currents between 3 and 400 Amperes. The cathode of diode 90 is coupled through a capacitor 96 and a resistor 98, in parallel, to a second terminal 100 of secondary coil 88 and also to a cathode of switch 94.

In operation, upon receiving a command signal from control circuit 36 on command signal line 48, the RESET input on timer circuit 44 is driven to a logical high, causing the output of timer circuit 44 to drive switch 66. Also, capacitor 54 begins charging from unregulated DC power supply 55 through resistors 56 and 58. Switch 66 provides current to primary coil 82 to begin energizing or charging primary coil 82. No current is reflected in secondary coil 88 because diode 90 blocks current traveling in the counterclockwise direction. After a short charging time period (e.g., 4.5 microseconds, or more or less depending upon the application), this first charging phase ends and a second, discharging phase begins. Timer circuit 44 expires after the charging time period, turning off switch 66 and allowing capacitor 54 to discharge through resistor 58 to the discharge input on timer circuit 44.

Without flyback transistor 76, timer circuit 44 would fire again once capacitor 54 is discharged. However, primary coil 82 creates a flyback effect, causing the voltage at input terminal 68 to rise. When this voltage rises a diode drop above the DC voltage of power supply 55 (i.e., +24 VDC), switch 76 (e.g., a transistor) turns on, which disallows timer circuit 44 to fire even after capacitor 54 is discharged. The raised voltage at input terminal 68 is reflected to secondary coil 88, causing current (i.e., a switch drive signal) to flow through diode 90 into gate 92. Switch 94 turns on, allowing welding current to flow from the anode to the cathode.

While a delay of 4.5 microseconds is present between receipt of the command signal on line 48 and providing the switch drive signal, this delay is considered insignificant since the turn-on time of switch 94 is typically at least 15–20 microseconds or more.

Since the voltage at input terminal 102 of secondary coil 88 is clamped to approximately 4 Volts by gate 92, a relatively long time is required for transformer 70 to be drained of its energy from the charging phase. This second, discharge phase lasts approximately 25 microseconds, or greater or less than 25 microseconds based upon the application. Once the voltage at input terminal 68 drops to less than a diode drop above the DC voltage of power supply 55, transformer 70 is effectively reset, switch 76 turns off, and timer circuit 44 fires again (i.e., returns to a first charging phase) to again charge primary coil 82. During this charge phase, capacitor 96 holds a charge on gate 92 since no current is provided to gate 92 from secondary coil 88. Capacitor 96 has enough energy to maintain current for gate 92 throughout the duration of the charge cycle. In this exemplary embodiment, a 0.1 microfarad capacitor is used.

Thus, a continuous current drive is provided to gate 92 so long as the command signal on line 48 remains high. Because gate 92 is repetitively pulsed by isolation circuit 38 at a relatively high frequency, on average, the gate drive signal becomes a continuous current. Other ways of providing a continuous current are contemplated, including currents that are pulsed and those that are not pulsed. The voltage provided at gate 92 is typically in a range between 1.5 and 4.0 volts when a continuous current is applied. The frequency of the switch drive signal may vary. When the command signal goes low, timer circuit 44 is reset, thereby disabling switch 66, and allowing any further charge in primary coil 82 to dissipate.

One advantage of this exemplary embodiment is that a continuous current is provided to gate 92 to ensure that switch 94 remains on so long as the command signal on command signal line 48 is high (i.e., a logical "1", such as 5 volts, 3.3 volts, etc.).

Another advantage is that timer circuit 44 can operate at a relatively high frequency, such as 35 kHz to 50 kHz or more, when cycling from the first charging phase to the second discharging phase. This allows for a smaller primary inductance at primary coil 82, which results in a smaller and less expensive transformer, thereby saving cost and space.

Another feature of this exemplary embodiment relates to the timing of timer circuit 44. The current acquired in primary coil 82 is based on the voltage applied, the time duration of the charge, and the inductance of transformer 70. It is preferable to pull drive current into primary coil 82 from an unregulated power supply. Pulling the current through a regulated power supply dissipates needed power. Using an unregulated power supply improves efficiency, but can cause transformer charging inconsistencies if timing circuit 44 is timed by a regulated power supply. Since the voltage supplied to transformer 70 is unregulated, the time duration of charging transformer 70 is used to compensate for variances in the voltage on power supply 55, as follows. The discrete timing elements, resistors 56 and 58 and capacitor 54, in this embodiment, are coupled to and powered by unregulated power supply 55. Although timer circuit 44 is powered by the +15 VDC regulated power supply 63, the timing of circuit 44 (i.e., at the THD and Trigger pins) is run off of the +24 VDC unregulated power supply 55. Now the timing of timer circuit 44 runs inversely proportional to the unregulated voltage used to drive transformer 70. For example, if the voltage of power supply 55 rises, the voltage across capacitor 54 rises, and the duration of the charge phase of timer circuit 44 decreases, thereby maintaining the charging of transformer 70 relatively consistent over time.

Diodes 60 and 72, and capacitor 62 form a clamp circuit to protect switch 66 from the high voltage spike created between the time switch 66 turns off and the time current begins to flow in secondary coil 88.

According to another advantage, a simple digital command signal is able to drive an SCR or other switch on and off, while providing isolation between the command signal and the SCR. Further, switch 76 prevents transformer 70 from being charged again until it is reset by the load on secondary coil 88.

In an exemplary single-phase power, supply application, four of switches 94 can be driven with two of isolation circuits 38. Alternatively, a single timer circuit may be used with multiple MOSFET switches, as shown in the alternative embodiment of FIG. 4

Figure 4:
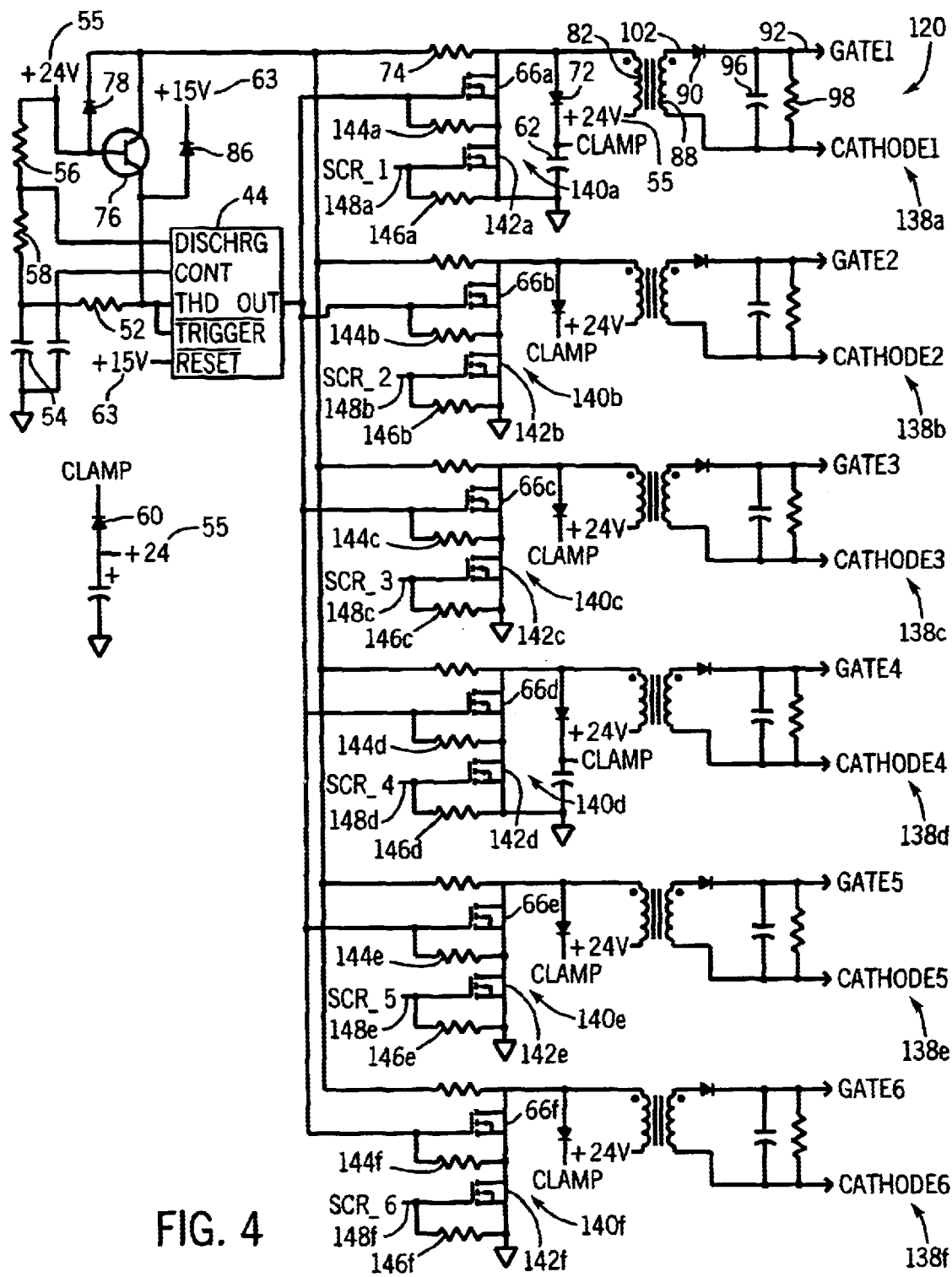
FIG. 4 is a schematic diagram of an isolation circuit according to an alternative embodiment.

Referring to FIG. 4, an alternative embodiment suitable for a three-phase power supply is shown. Elements similar to those in FIG. 3 are similarly numbered. Advantageously, circuit 120 includes a plurality of isolation circuits 138a, 138b, 138c, 138d, 138e and 138f, each configured to drive a different switch of a three-phase power conversion circuit. Each of isolation circuits 138a–f includes a respective enabling switch 140a–f having a transistor 142a–f, a resistor 144a–f, and a resistor 146a–f. Each of resistors 144a–f is coupled between a gate of switches 66a–f and a source of transistors 142a–f. Each of resistors 146a–f is coupled between a drain and a gate of transistors 142a–f, the drains being coupled to ground. The gates of transistors 142a–f are each coupled to an enable pin 148a–f of control circuit 36. The output of timer circuit 44 is coupled to the gates of switches 66a–f. The reset pin of timer circuit 44 is tied to DC power supply 63.

In operation, control circuit 36 selectively enables one or more of isolation circuits 138a–f by applying a logical high to the selected gates of switches 66a–f. Timer circuit 44 triggers the gates of all of switches 66a so long as any one of the enable pins of control circuit 36 is driven high. However, only those of isolation circuits 138a–f which are enabled by control circuit 36 via respective enable pins 148a–f provide a continuous current drive to the gates of the respective switches.

This embodiment is advantageous because it allows multiple isolation circuits to function with only one timer circuit, thereby greatly reducing component costs for a three-phase application. Naturally, this configuration may be implemented in single-phase applications having multiple switches, and in other applications.

While the exemplary embodiments illustrated in the FIGS. and described above are presently preferred, it should be understood that these embodiments are offered by way of example only. For example, other isolation circuit arrangement may be used besides flyback transformers. Further, flyback transformer circuits without timers may be used, and circuits with other schematic arrangements may also be used. Accordingly, the present invention is not limited to a particular embodiment, but extends to various modifications that nevertheless fall within the scope of the appended claims.

What is claimed is:

1. A circuit for controlling the welding power of a welding power supply, comprising:
   a control circuit configured to generate a command signal;
   a switch; and
   an isolation circuit having a flyback transformer, the isolation circuit configured to receive the command signal and to provide a switch drive signal to the switch in response to the command signal, wherein the switch provides welding power in response to the switch drive signal.

2. The circuit of claim 1, wherein the switch drive signal is a continuous current signal provided so long as the command signal is high.

3. The circuit of claim 1, wherein the switch includes a silicon-controlled rectifier.

4. The circuit of claim 1, wherein the flyback transformer includes a first coil and a second coil, further comprising a timer circuit configured to receive the command signal and to charge the first coil of the flyback transformer during a first phase and to allow the first coil to discharge during a second phase.

5. The circuit of claim 4, wherein the flyback transformer circuit further includes a diode coupled between the second coil and the switch configured to prevent current flow from the second coil to the switch during the first phase.

6. The circuit of claim 4, wherein the first phase lasts approximately 4.5 microseconds.

7. The circuit of claim 4, wherein the flyback transformer circuit further includes a capacitor coupled between the second coil and the switch configured to supply current to the switch during the first phase.

8. The circuit of claim 4, wherein a switch is operable during the second phase to disable the timer circuit until a voltage on the primary coil decreases to a predetermined voltage.

9. The circuit of claim 1, wherein the command signal is a digital signal.

10. The circuit of claim 4, wherein the timer circuit cycles from the first phase to the second phase at a frequency of between 35 kHz and 50 kHz.

11. The circuit of claim 4, further comprising:
    an unregulated DC power supply coupled to the first coil; and
    at least one discrete timing element coupled between the unregulated DC power supply and the timer circuit, wherein the time duration of the first phase is adjusted based on the magnitude of the unregulated DC power supply, whereby the charge provided to the first coil remains relatively constant over changes in the DC power supply.

12. The circuit of claim 1, further comprising:
    a second switch; and
    a second isolation circuit having a second flyback transformer, the control circuit configured to provide a second command signal to the isolation circuit, the isolation circuit configured to provide a switch drive signal to the second switch in response to the second command signal.

13. The circuit of claim 12, further comprising a timer circuit coupled to the first and second isolation circuits configured to charge the flyback transformer and/or the second flyback transformer based upon the command signal and the second command signal.

14. A welding power supply, comprising:
    a power conversion circuit having at least one switch configured to provide welding power;
    a control circuit configured to generate a command signal; and
    an isolation circuit configured to provide isolation between the switch and the control circuit, the isolation circuit responsive to the command signal to charge a coil during a first phase and discharge the coil during a second phase, wherein the coil provides current to the switch only during the second phase.

15. The welding power supply of claim 14, wherein the switch is a silicon-controlled rectifier.

16. The welding power supply of claim 14, wherein the isolation circuit includes:
    a flyback transformer, wherein the coil is the primary coil of the flyback transformer; and
    a timer circuit configured to receive the command signal and to charge the primary coil of the flyback transformer during the first phase and to allow the primary coil to discharge during the second phase.

17. The welding power supply of claim 16, wherein the isolation circuit further includes a diode coupled between the secondary coil and the switch configured to prevent current flow from the secondary coil to the switch during the first phase.

18. The welding power supply of claim 17, wherein the isolation circuit further includes a capacitor coupled between the secondary coil and the switch configured to supply current to the switch during the first phase.

19. A circuit for controlling the welding power of a welding power supply, comprising:
    means for generating a command signal;
    means for gating welding power from a power source to a welding output; and means for isolating the means for generating from the means for gating, and for providing a continuous current drive signal to the means for gating.

20. The circuit of claim 19, wherein the means for gating includes a silicon-controlled rectifier.

21. The circuit of claim 19, wherein the means for isolating includes a means for cycling between a first phase during which current is provided to the means for gating from a first circuit and a second phase during which current is provided to the means for gating from a second circuit.

22. The circuit of claim 21, wherein the first circuit includes a flyback transformer.

23. The circuit of claim 22, wherein the second circuit includes a diode coupled to a capacitor.

* * * * *